(12) United States Patent
Lamb et al.

(10) Patent No.: US 11,269,111 B2
(45) Date of Patent: Mar. 8, 2022

(54) GRAVITY GRADIOMETER

(71) Applicant: The University of Birmingham, Birmingham (GB)

(72) Inventors: Andrew Lamb, Birmingham (GB); Geoff De Villiers, Birmingham (GB); Michael Holynski, Birmingham (GB); Kai Bongs, Birmingham (GB)

(73) Assignee: THE UNIVERSITY OF BIRMINGHAM, Birmingham (GB)

( * ) Notice: Subject to any disclaimer, the term of this patent is extended or adjusted under 35 U.S.C. 154(b) by 42 days.

(21) Appl. No.: 16/772,517

(22) PCT Filed: Dec. 14, 2018

(86) PCT No.: PCT/GB2018/053630
§ 371 (c)(1),
(2) Date: Jun. 12, 2020

(87) PCT Pub. No.: WO2019/116047
PCT Pub. Date: Jun. 20, 2019

(65) Prior Publication Data
US 2020/0386906 A1 Dec. 10, 2020

(30) Foreign Application Priority Data

Dec. 15, 2017 (GB) ...................................... 1721010

(51) Int. Cl.
*G01V 7/14* (2006.01)
*G01N 21/65* (2006.01)
*G01V 7/04* (2006.01)

(52) U.S. Cl.
CPC ............... *G01V 7/14* (2013.01); *G01N 21/65* (2013.01); *G01V 7/04* (2013.01)

(58) Field of Classification Search
CPC ............. G01N 21/65; G01V 7/04; G01V 7/14
See application file for complete search history.

(56) References Cited

U.S. PATENT DOCUMENTS

| 3,688,584 A | 9/1972 | Stone et al. |
| 6,658,935 B1 | 12/2003 | Feinberg |

(Continued)

FOREIGN PATENT DOCUMENTS

| CN | 103472494 A | 12/2013 |
| CN | 103472495 A | 12/2013 |

(Continued)

OTHER PUBLICATIONS

International Search Report dated Mar. 12, 2019 for corresponding International Application No. PCT/GB2018/053630, filed Dec. 14, 2018.

(Continued)

*Primary Examiner* — Francis C Gray
(74) *Attorney, Agent, or Firm* — David D. Brush; Westman, Champlin & Koehler, P.A.

(57) ABSTRACT

The disclosure relates to a gravity gradiometer including a pair of magneto-optical traps for measuring a gravity gradient. A cold atom gravity gradiometer system includes comprising: first and second magneto-optical traps, each having a plurality of mirrored surfaces arranged to reflect an incident laser beam to trap respective first and second cold atom clouds separated from each other by a separation distance; an optical subsystem arranged to transmit a first laser beam in a first direction along a first longitudinal axis towards the first magneto-optical trap and a second laser beam in an opposite second direction along a second longitudinal axis towards the second magneto-optical trap, the second longitudinal axis being parallel to the first longitudinal axis.

25 Claims, 10 Drawing Sheets

(56) References Cited

U.S. PATENT DOCUMENTS

| | | |
|---|---|---|
| 9,134,450 B2 | 9/2015 | Desruelle et al. |
| 10,330,459 B1 * | 6/2019 | Matthews .............. G01C 19/58 |
| 10,371,856 B1 * | 8/2019 | Kasevich ................. G01V 7/06 |
| 2010/0180680 A1 | 7/2010 | Zaugg |
| 2011/0073753 A1 | 3/2011 | Bouyer et al. |
| 2013/0215421 A1 * | 8/2013 | Stoner ...................... G01V 7/00 |
| | | 356/301 |
| 2014/0190254 A1 * | 7/2014 | Bouyer ................... G01V 7/14 |
| | | 73/382 G |
| 2014/0319329 A1 | 10/2014 | Bidel et al. |
| 2016/0178792 A1 * | 6/2016 | Kasevich ................. G01V 7/14 |
| | | 73/382 R |

FOREIGN PATENT DOCUMENTS

| | | |
|---|---|---|
| CN | 104007480 A | 8/2014 |
| CN | 103472494 B | 11/2015 |
| CN | 103472495 B | 1/2016 |
| CN | 104007480 B | 8/2016 |
| FR | 2848296 A1 | 6/2004 |
| WO | 2012090121 A2 | 7/2012 |
| WO | 2014106811 A2 | 7/2014 |

OTHER PUBLICATIONS

Written Opinion of the International Searching Authority dated Mar. 12, 2019 for corresponding International Application No. PCT/GB2018/053630, filed Dec. 14, 2018.

United Kingdom Search report for Application No. 1721010.5, dated Jun. 14, 2018.

Hinton A., et al. "A portable magneto-optical trap with prospects for atom interferometry in civil engineering", Journal Article, rsta.royalsocietypublishing.org, dated Jun. 26, 2017, 16 pages.

Fixler, Jeffrey, "Atom Interferometer-Based Gravity Gradiometer Measurements", A Dissertation Presented to the Faculty of the Graduate School of Yale University in Candidacy for the Degree of Doctor of Philosophy, dated Dec. 2003, 151 pages.

Lee K. I. et al., "Single-beam atom trap in a pyramidal and conical hollow mirror" Optics Letters, vol. 21, No. 15, dated Aug. 1, 1996, 3 pages.

* cited by examiner

GRAVITY GRADIOMETER

CROSS-REFERENCE TO RELATED APPLICATIONS

This Application is a Section 371 National Stage Application of International Application No. PCT/GB2018/053630, filed Dec. 14, 2018, which is incorporated by reference in its entirety and published as WO 2019/116047 A1 on Jun. 20, 2019, in English.

FIELD OF THE INVENTION

The invention relates to a gravity gradiometer comprising a pair of magneto-optical traps for measuring a gravity gradient.

BACKGROUND

Gravity gradiometry involves measuring very small differences in the gravitational field, and can be used to determine variations in the density of subsurface materials, underground or undersea. Such measurements can be used to detect and characterise underground formations such as oil or gas reservoirs. For such measurements to be useful, however, the accuracy of the measurements needs to be extremely high, and any sources of interference or error need to be minimised as far as possible. Current technology allows very accurate measurements to be taken, but these measurements can be very slow due to the need to minimise sources of interference.

One known technique for making measurements of gravity gradients involves the use of a pair of cold atom traps, for example as described in WO 2014/106811 A2, in which a pair of magneto-optical atom traps are used to determine local measures of acceleration (being equivalent to gravity) at two points separated by a set distance. In this arrangement, a laser beam is directed to first and second spatially separated reflectors that generate a plurality of trapping laser beams directed towards first and second samples of cold atoms. A central hole is arranged within the first reflector that allows a portion of the laser beam to transmit through the first reflector and towards the second reflector. Local acceleration measurements are made by first switching off the laser beam and gradient coils, allowing the cold atom samples to undergo free-fall.

The laser beam is then changed to generate a Raman pulse sequence that creates two spatially separated cold atom interferometers. The samples are then interrogated to measure the fraction of atoms from each sample that are in one or more ground state sublevels, allowing a local acceleration experienced by each cold atom cloud to be computed. In common with other approaches, this arrangement has the advantage of using a common laser beam, which allows for a high common mode rejection, but has stringent optical requirements and requires a high vacuum common to both traps. Other problems associated with this type of arrangement relate to diffraction, alignment and beam quality of the laser beam between the first and second reflectors, which can limit the practical separation distance between the cold atom clouds, and optical shadowing in which the cooling beams are attenuated when passing through both clouds.

SUMMARY OF THE INVENTION

In accordance with a first aspect of the invention there is provided a cold atom gravity gradiometer system comprising:

- first and second magneto-optical traps, each having a plurality of mirrored surfaces arranged to reflect an incident laser beam to trap respective first and second cold atom clouds separated from each other by a separation distance; and
- an optical subsystem arranged to transmit a first laser beam in a first direction along a first longitudinal axis towards the first magneto-optical trap and a second laser beam in an opposite second direction along a second longitudinal axis towards the second magneto-optical trap, the second longitudinal axis being parallel to the first longitudinal axis.

The first laser beam may comprise a first cooling laser beam and a first atom interferometry beam, while the second laser beam comprises a second cooling laser beam and a second atom interferometry beam. The atom interferometry beams may for example be beams for stimulating Raman or Bragg transitions in the cold atom clouds, and may therefore be alternatively termed Raman or Bragg beams. References herein to Raman beams may therefore be applied more generally to atom interferometry beams.

In some examples the first and second atom interferometry beams may be substantially coaxial with the respective first and second cooling laser beams.

The system may further comprise first and second intermediate reflection surfaces arranged to reflect the respective first and second laser beams back towards the respective first and second cold atom clouds.

Such a gradiometer enables cold atom gravity gradiometry over long and adjustable baselines in a more compact radial profile than in previous approaches, and also addresses several of the beam-related issues which may arise in previous approaches. The beam arrangement of the present gradiometer has been shown to enable gradiometry measurement with beam delivery through a single port, enabling a reduced number of windows and complexity for the physics package (in particular, having ramifications in reducing the cost, weight and size of the vacuum system and magnetic shielding). Furthermore, the first and second magneto-optical traps may be housed either in a single chamber, or in two separate chambers, enabling an adjustable baseline and the measurement of higher order terms through creating "kinks" in the measurement axis, as described in more detail below.

Each of the first and second magneto-optical trap, and associated cooling, Raman and detection systems, may be referred to as a gravimeter—i.e. the gradiometer comprises two separated gravimeters.

The use of the first and second intermediate reflection surfaces in particular separates the dependencies of the cooling and interferometry beams, and has the advantage of allowing realisation of gravity gradient measurements in vibration environments, and facilitates longer term stability in gravity measurements when using the same system.

The optical subsystem may be arranged to transmit a cooling laser beam and one or more Raman laser beams in a first direction along a first longitudinal axis towards the first magneto-optical trap and in an opposite second direction along a second longitudinal axis towards the second magneto-optical trap. The one or more Raman laser beams may comprise Raman light of two different wavelengths. The gradiometer system may further comprise a detection system for detecting acceleration of atoms trapped in the first and second magneto-optical traps.

In some embodiments, each of the first and second magneto-optical traps may comprise four mirrored surfaces angled with respect to the respective first and second intermediate reflection surfaces and arranged around the respective first and second longitudinal axes to reflect the respective first and second incident laser beams towards the respective first and second cold atom clouds. The mirrored surfaces may be mirrored surfaces of one or more prisms. The mirrored surfaces provide the multi-directional laser beams necessary to cause trapping of atoms, in a compact arrangement.

In some embodiments, the first longitudinal axis may be substantially coincident with the second longitudinal axis. This arrangement may particularly be used if only the z-component of the gravity gradient is to be measured, and provides a compact gradiometer.

In some embodiments, the first and second intermediate reflection surfaces may be arranged on the respective first and second longitudinal axes.

In some embodiments, the second longitudinal axis may be laterally offset from the first longitudinal axis. Such a "kinked" arrangement may allow additional components of the gravity gradient to be determined, whilst maintaining an effectively single optical axis arrangement.

In some embodiments, the first and second intermediate reflection surfaces may be arranged on a lateral axis between the first longitudinal axis and the second longitudinal axis. The system may further comprise first and second deflection surfaces to deflect the laser beam onto the lateral axis from the first longitudinal axis and second longitudinal axis respectively.

In some embodiments, the optical subsystem may be further arranged to transmit a Raman beam along an atom interferometry axis towards the first and second magneto-optical traps, and wherein the angle between the atom interferometry axis and the first longitudinal axis is greater than 0°. Such an arrangement allows greater flexibility in the implementation of the optical subsystem.

In some such embodiments, the optical subsystem may be arranged to direct a first Raman beam towards the first magneto-optical trap in a first direction along the atom interferometry axis, and to direct a second Raman beam towards the second magneto-optical trap in an opposite, second direction along the atom interferometry axis.

In some such embodiments, the system may further comprise a Raman mirror positioned along the atom interferometry axis after the first and second magneto-optical traps, and arranged to reflect the Raman beam back along with atom interferometry axis towards the second and first magneto-optical traps.

In other embodiments, a Raman beam may be transmitted as part of the laser beam, or along a co-incident axis to the laser beam, to determine the gravity gradient, as would be understood by the person skilled in the art.

In some embodiments, the first and second intermediate reflection surfaces may be arranged to reflect the incoming laser beam away from a central region between the first and second magneto-optical traps. Centering the intermediate reflection surfaces provides improved noise cancellation between the two gravimeters.

In some embodiments, the first and second intermediate reflection surfaces form opposing first and second surfaces of an intermediate reflector.

According to a second aspect of the invention there is provided a cold atom gravity gradiometer system comprising:
 first and second magneto-optical traps, each having a plurality of mirrored surfaces arranged to reflect an incident laser beam to trap respective first and second cold atom clouds separated from each other by a separation distance; and
 an optical subsystem arranged to transmit a first laser beam in a first direction along a first longitudinal axis towards the first and second magneto-optical traps and a second laser beam in an opposite second direction along a second longitudinal axis towards the second and first magneto-optical traps,
 wherein the first magneto-optical trap is arranged on the first longitudinal axis and the second magneto-optical trap is arranged on the second longitudinal axis, and
 wherein the second longitudinal axis is parallel to and laterally offset from the first longitudinal axis.

The gravimeter according to the second aspect is thus similar to the "kinked" embodiments of the gradiometer according to the first aspect, and provides the same advantage of allowing measurement of additional components of the gravity gradient. In contrast to the gradiometer of the first aspect, the gradiometer of the second aspect does not comprise intermediate reflection surfaces arranged to reflect the laser beam back towards the respective first and second cold atom clouds. Cooling and Raman laser beams instead travel from one gravimeter of the gradiometer to the other gravimeter of the gradiometer. For example, a single cooling laser beam may be used, incident on the first magneto-optical trap, and the residual cooling beam may then be incident upon the second magneto-optical trap, forming the sixth cooling beam of the second magneto-optical trap. Raman beams may be transmitted from the first to the second magneto-optical trap, or a first Raman beam may be transmitted from the first to the second magneto-optical trap and a second Raman beam may be transmitted from the second to the first magneto-optical trap. Such gradiometers may yield reduced tilt noise due to enhanced common suppression of noise, and linked spatial dependencies on the Raman or interferometry beams.

In some embodiments the system may comprise a first deflection surface arranged to deflect the first laser beam from the first longitudinal axis onto a lateral axis between the first and second longitudinal axes, and to deflect the second laser beam from the lateral axis onto the first longitudinal axis; and a second deflection surface arranged to deflect the second laser beam from the second longitudinal axis onto the lateral axis, and to deflect the first laser beam from the lateral axis onto the second longitudinal axis.

In some embodiments of either aspect, the system may be rotatable around at least one rotation axis. For example, a rotation axis may pass through a central point between the first magneto-optical trap and the second magneto-optical trap. A rotation axis may be parallel to the first and second longitudinal axes. A rotation axis may be orthogonal to the first and second longitudinal axes. A rotation axis may be parallel to the lateral axis, and may be coincident with the lateral axis. A rotation axis may be orthogonal to both the lateral axis and the first and second longitudinal axes. The rotatable system allows the full gravity gradiometer tensor to be determined, with only two gravimeters.

In some embodiments of either aspect, the first and second magneto-optical traps may be disposed within respective first and second vacuum chambers. The first and second vacuum chambers may be connected to a vacuum system disposed at least partially between the first and second vacuum chambers. The first and second vacuum chambers may be isolated from each other, and so may be independent vacuum chambers, which may be simpler to manufacture.

In some embodiments of either aspect, the separation distance may be adjustable. In this way, the baseline of the gradiometer system may be adjusted to the match the needs of a particular experiment, whilst retaining a compact radial profile.

According to a third aspect of the invention there is provided a method of determining a gravity gradient using a gravity gradiometer system according to any embodiment of the first or second aspect, wherein the first longitudinal axis is offset from the second longitudinal axis, the method comprising:

measuring a first gravity difference between the first magneto-optical trap and second magneto-optical trap of the gradiometer system with the gradiometer system in a first position;

rotating the gradiometer system by substantially 180° about a rotation axis from the first position to a second position, the rotation axis being parallel to the first longitudinal axis and second longitudinal axis;

measuring a second gravity difference between the first magneto-optical trap and second magneto-optical trap of the gradiometer system with the gradiometer system in the second position;

determining a first component of the gravity gradient from the sum of the first gravity difference and the second gravity difference; and determining a second component of the gravity gradient from the difference between the first gravity difference and the second gravity difference.

This method allows multiple components of the gravity gradient to be determined from just two gravimeters.

In some embodiments, the method may further comprise:
rotating the gradiometer system about an additional rotation axis to a third position, the additional rotation axis being orthogonal to the first longitudinal axis and second longitudinal axis; and measuring an additional gravity difference between the first magneto-optical trap and second magneto-optical trap of the gradiometer system with the gradiometer system in the third position.

In particular, rotating the gradiometer system about the additional rotation axis may comprise rotating the gradiometer system by a tilting angle about the additional rotation axis. The tilting angle may be less than 90°, or may be less than 30°, or may be less than 10°. The tilting angle may be determined by the maximum beam width of a Raman beam incident upon the first and/or second magneto-optical trap.

The additional rotation may allow more, or all, of the components of the gravity gradient to be determined.

DETAILED DESCRIPTION

The invention is described in further detail below by way of example and with reference to the accompanying drawings, in which.

Figure 1:
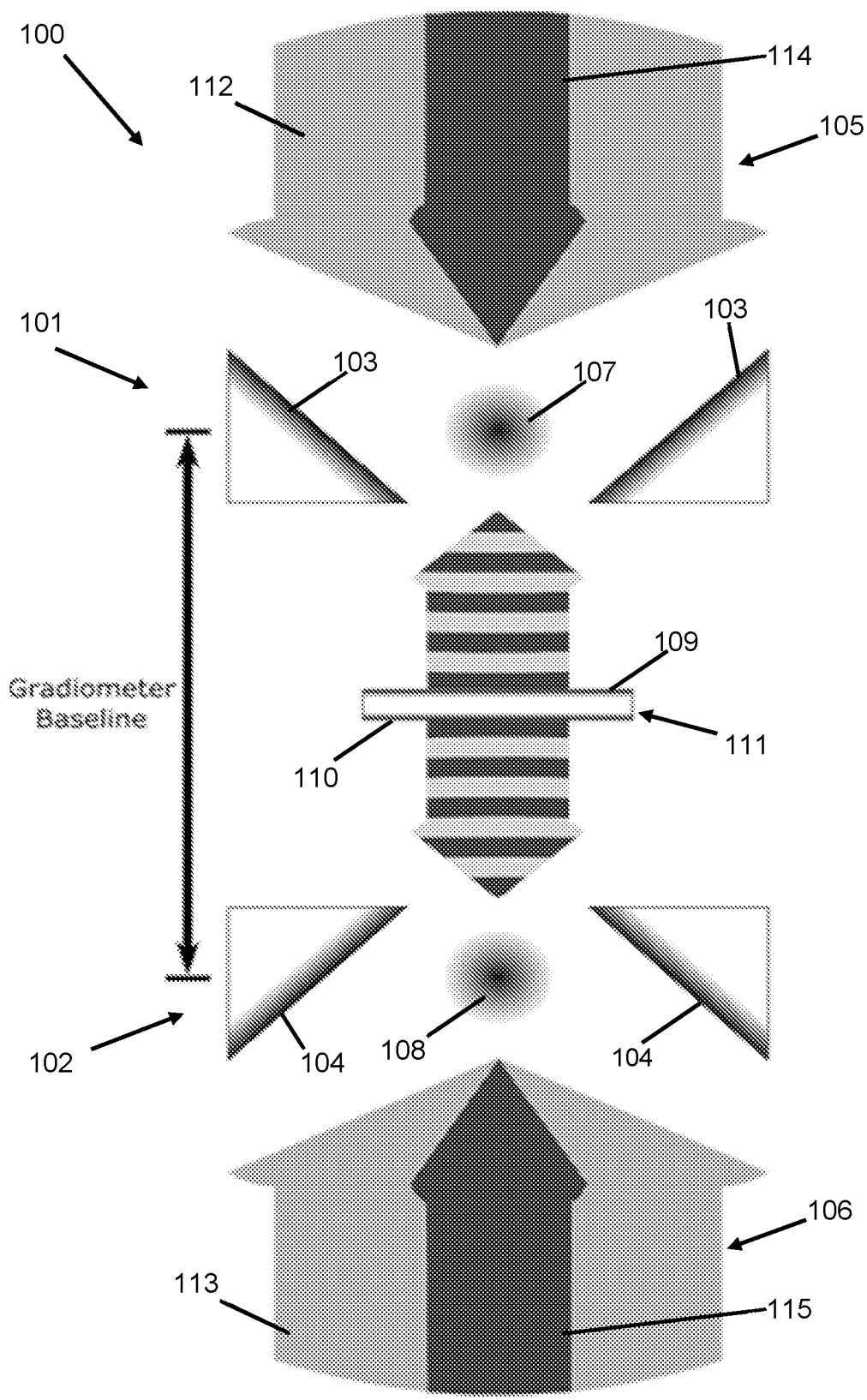
FIG. 1 shows a schematic representation of an embodiment of a gradiometer system.

Atom interferometry is a technology based on the quantum interpretation of atoms as matter waves. Atom interferometric sensors are essentially drift-free and promise 10-100 fold higher sensitivity than current technology at a smaller cost, and with increased environmental resilience.

The basic idea of atom interferometric gravity gradient sensors is simple: they measure the trajectories of two vertically separated ensembles of atoms under the influence of gravity using a laser ruler. The gravity gradient will show up in tiny differences in how the two ensembles drop: a density anomaly in the ground will attract the lower ensemble more than the higher one, leading to the lower ensemble to drop faster. The key to high sensitivity lies in the exploitation of quantum features of the atomic probe particles. During the measurement two nearly resting atomic ensembles are first prepared in a small vacuum chamber using laser cooling. Then these ensembles are dropped and during their free-fall in the gravity field are subjected to three consecutive laser pulses, spaced equally in time. These pulses are tailored to encode the position of the atom at the time of the pulse into the phase of its matter wave function. This is performed in a way leading to a small quantum calculation which calculates the second derivative of the trajectory with respect to time, which is directly proportional to gravity. The difference between the results for the two vertically separated ensembles results in the gravity gradient output of the sensor.

An alternative way to look at the operation of an atom interferometer is in the matter wave picture, regarding the atoms as matter waves. In this picture, the first laser pulse provides a 50% probability of exciting the atoms, i.e. putting each atom into a quantum superposition of ground and excited state. As the excited part of the atomic wavefunction will not only have absorbed the energy, but also the momentum of the exciting photon, the ground and excited state parts of the wavefunction will move apart during the following evolution. The second laser pulse is timed to invert the state population, i.e. cause a transition from the ground state to the excited state under absorption of a photon and form the excited state to the ground state under stimulated emission of a photon. This process also inverts the relative momentum of the two parts of the atomic wavefunction, which start to approach each other again. The third pulse occurs when the two parts of the wavefunction overlap again and provides 50% probability of excitation, effectively mixing and interfering the two parts of the atomic wavefunction. The outputs of this interferometer are atoms in the ground state and atoms in the excited state, with the relative state population being a function of the relative phase difference between the two interfering wavepackets at the time of the last laser pulse. The readout is a simple state-dependent detection, counting the atom number in each state using laser pulses resonant with only a single state and recording the number of photons scattered by the atoms with a photodiode or CCD camera.

Particular advantages of using quantum technology based methods for gravity gradiometry are threefold. (1) Using atoms as probe particles, any issues relating to manufacturing tolerances and mechanical wear may be avoided. (2) Using the same laser ruler for both ensembles ensures an ideal cancellation of common-mode accelerations and tilts, two of the key issues in alternative technologies. This greatly eases the use on moving platforms or in challenging environments. (3) The measurement can be linked to the frequency defined by atomic transitions, making the technology essentially drift-free. This enables comparative long-term measurements, e.g. coming back to the same site after a year would still allow one to make comparisons. This is of particular relevance for long term environmental monitoring or gravity map matching for long term navigation.

The key components of an atom interferometry sensor include a vacuum system, magnetic coils, magnetic shielding, a laser system, a detection system, a control system and inertial stabilisation.

Vacuum System

In order to function properly, the atoms need to undergo an unperturbed free-fall during the measurement period, since any collision with a background gas atom would change the phase. In order to have negligible collisions during a measurement period of 300 ms, at least 3 s between collisions would be required, which corresponds to a vacuum of roughly $10^{-9}$ mbar. The lifetime of the magneto-optical trap used to collect and pre-cool the atoms provides a good estimate of the time between collisions and can be used for a quick assessment of the vacuum performance.

Magnetic Coils

The laser trapping and cooling stage requires an inhomogeneous magnetic field in order to define the initial position of the atoms. This is typically generated by an anti-Helmholtz coil configuration, which generates a magnetic field gradient of, for example, up to 15 G/cm around a central zero magnetic field.

Magnetic Shielding

In order to avoid the atom interferometer reacting to magnetic fields, the interferometry region may be shielded using a mu-metal shield, reducing magnetic field gradients. In addition a bias-field coil may be installed inside the magnetic shield, creating a homogenous magnetic field of a few 10 to a few 100 mG, defining the "quantization axis" of the atoms, i.e. making sure that the laser pulses only excite the desired atomic transitions.

Laser System

The laser system needs to address the atomic resonances with high precision. For rubidium, for example, the resonances have a natural linewidth of 6 MHz, and so the laser needs to be stable to roughly 1 part in a billion in absolute frequency. This requirement is a central challenge in producing a robust and reliable atom interferometer sensor for field operation. In addition, the laser system needs to provide two frequencies spaced by 6.8 GHz and 6.5 GHz for laser cooling and atom interferometry respectively and it needs to be detuned by a few GHz away from the resonance for the atom interferometry pulses, in order to avoid undesired decoherence due to spontaneous emission events.

Detection System

The detection system needs to be able to determine the number of atoms in the different atomic states without adding additional noise into the system. In quantum terms, the detection will usually (without any deeper quantum effects, such as squeezing) be limited by the counting statistics of the atoms leading to a signal to noise ratio which scales as the square root of the atom number.

Control System:

A computer control system may be used to provide the timing for the atom interferometer, capable of controlling sequences of pulses with high precision and a relative time jitter below the desired relative gravity sensitivity, for example 1 in $10^9$. However, these requirements are significantly reduced in a gravity gradient configuration.

Inertial Stabilisation

The system may be inertially stabilised, in order to avoid coupling of undesired parameters, such as e.g. rotation or vibration, into the measurement outputs. This stabilisation may be done at system level, at the retro-reflection mirror for the laser pulses or in a combination of both. The requirements here are also reduced drastically through use of a gravity gradient configuration, where any movement or vibration can be mostly common to both atom traps, provided the supporting framework is sufficiently rigid.

Gravity traverses all materials with essentially no attenuation (apart from a 1/r fall-off). This makes gravity and gravity gradient measurements ideally suited to look into the ground. Potential targets range from small near-surface items such as mines via pipes and medium-sized features such as tunnels and underground factories to large deep-lying features such as oil- and mineral-bearing rocks and structures in the Earth magma layers. While the first could provide valuable underground intelligence, the latter could act as reference points in map-matching navigation applications. The identification and visualisation of these structures is not trivial and requires specialised inversion and mapping algorithms.

An example embodiment of a gradiometer system 100 according to the present invention is shown in FIG. 1. The system 100 comprises a first magneto-optical trap (MOT) 101, and a second MOT 102. Each MOT comprises a plurality of mirrored surfaces 103, 104 arranged to reflect a respective incident laser beam 105,106 to trap a respective cold cloud of atoms 107, 108. The mirrored surfaces may in particular be the angled surfaces of a prism or a plurality of prisms. Each MOT 101, 102, effectively forms part of a separate gravimeter.

Figure 10:
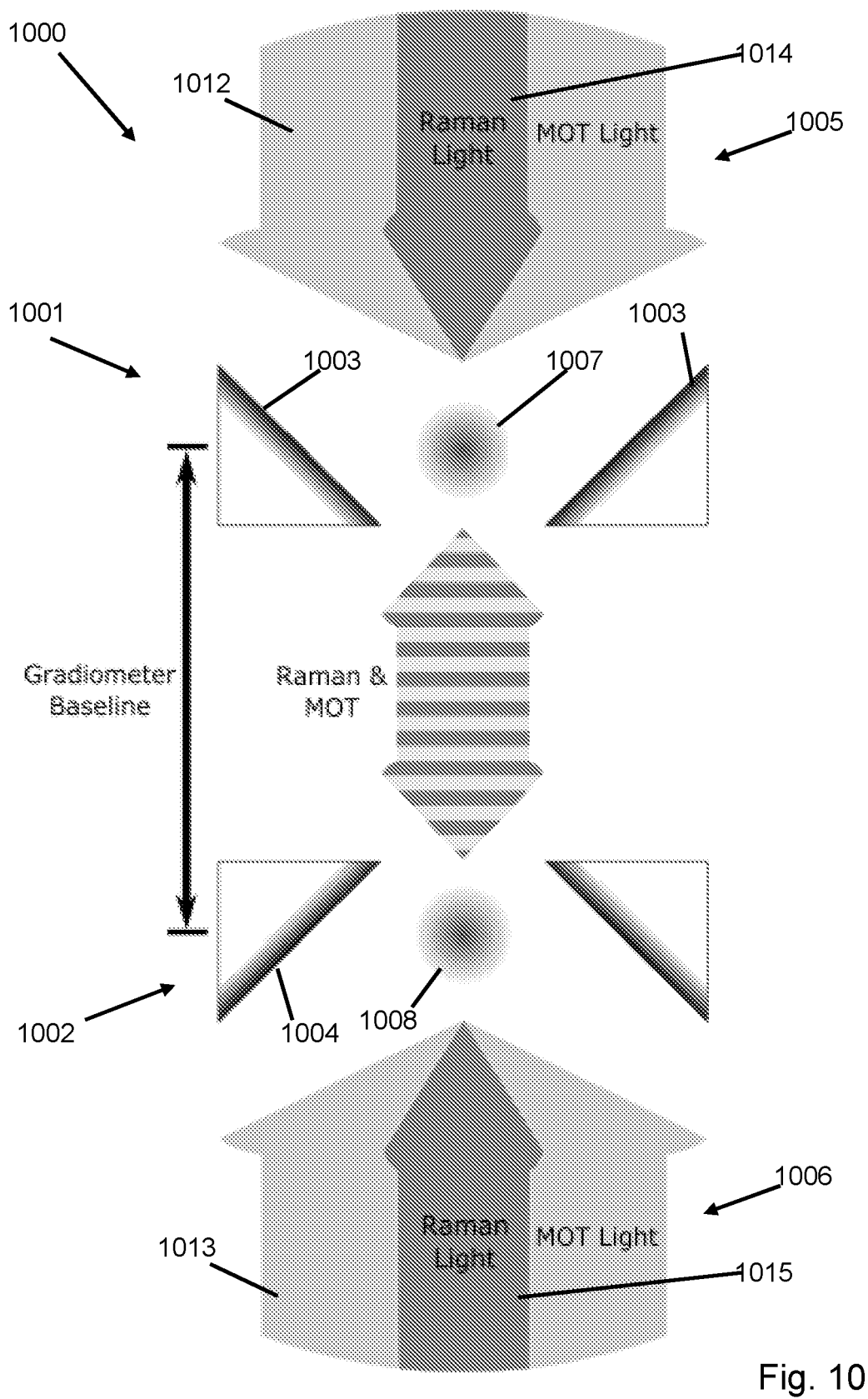
FIG. 10 is a schematic representation of an alternative embodiment of a gradiometer system.

After passing through the first MOT 101, laser beam 105 is incident upon a first intermediate reflection surface 109. First intermediate reflection surface 109 is arranged to reflect the laser beam 105 back into the first MOT 101, and particularly back into the cloud of atoms 107. Similarly, a second intermediate reflection surface 110 is arranged to reflect laser beam 106 back into the second MOT 102. In the illustrated embodiment, the first and second intermediate reflection surfaces 109, 110 form opposing surfaces of an intermediate reflector 110. The intermediate reflector is positioned centrally between the first and second MOTs 101, 102, so that the path of each laser beam 105, 106 is approximately identical, helping to reduce noise in the gradiometer measurement. In alternative examples, the intermediate reflection surfaces 109, 110 may be not present, as shown in FIG. 10 described in more detail below.

Figure 11:
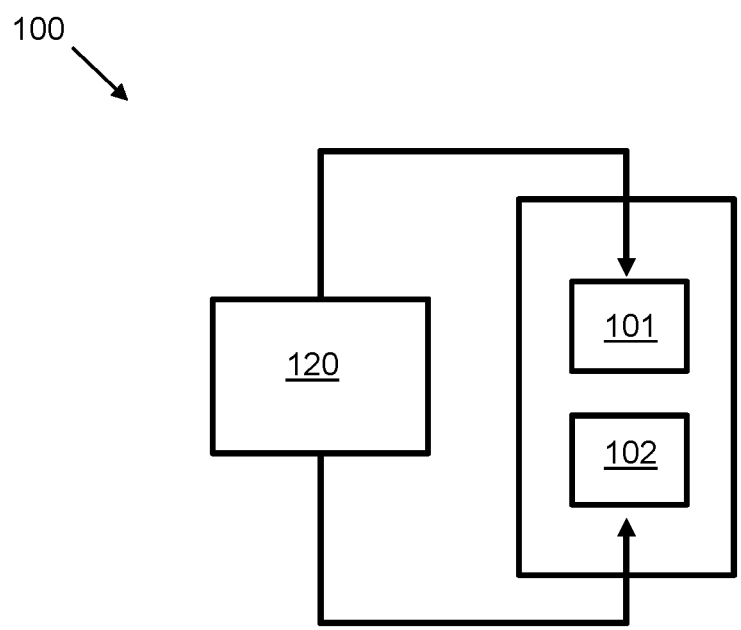
FIG. 11 is a schematic representation of an example gravity gradiometer system including an optical subsystem for providing laser beams to a pair of magneto-optical traps.

Referring also to FIG. 11, an optical subsystem 120 produces the laser beams 105, 106 and directs them onto the respective MOTs 101, 102. The optical subsystem 120 may provide separate first and second sets of laser beams for the respective MOTs 101, 102 or may divide a common laser source to provide the first and second laser beams. In the illustrated embodiment in FIG. 1, each laser beam 105, 106 comprises a cooling beam 112, 113 configured to trap atoms of the atom cloud 107; and an atom interferometry beam such as a Raman beam 114, 115 used for the gravity gradiometry measurements, as would be understood by the person skilled in the art. The Raman beams 114, 115 may each comprise Raman beams of two different wavelengths. Both the cooling 112, 113 and Raman 114, 115 beams are retro-reflected from the respective intermediate reflection surfaces 109, 110. The Raman beams 114, 115 may be off, or at low intensity when the respective cooling beams 112, 113 are on, or at high intensity, and vice versa. Typical beam diameters may for example be between 1 cm and 6 cm, or between 1 cm and 3 cm, or preferably between 1.8 cm and 2.2 cm for the Raman beams, and between 5 cm and 7 cm, or preferably between 5.8 cm and 6.2 cm for the cooling beams. In particular, the arrangement allows large diameter Raman beams to be used compared to conventional systems.

In the examples illustrated in FIGS. 1, 2, 3 and 10, the atom interferometry beams are substantially coaxial with the corresponding cooling beams. The angle between each atom interferometry beam and the respective cooling beams may be around zero, or may be a small angle such as less than 10 degrees, less than 5 degrees, less than 3 degrees or less than 1 degree.

Using the intermediate reflection surfaces 109, 110 allows for increased modularity of the gradiometer system 100. The system 100 effectively comprises two distinct gravimeters, each of which may be adjusted or replaced individually. It also allows the gradiometer system 100 to have a cylindrical form factor, with a radius set by the cooling beam diameter (although the overall outer diameter may be set by the diameter of the magnetic shield), and correspondingly by the diameter of the arrangement of mirrored surfaces 103. This is chosen based on the number of atoms required, and as such is limited by the desired performance rather than technology. Furthermore, the system has on-axis centre of mass, reduced shadowing effects, potentially no off-axis ports (and hence simpler manufacturing), and few optical axes.

The distance between the centre of the first MOT 101 and second MOT 102 defines the gradiometer baseline, z. The baseline may be adjustable. The length of the gradiometer may be set by the time required between the interferometry pulses, and by the baseline. The baseline may for example be between 0.5 m and 2 m, or between 0.8 m and 1.2 m. The overall length of the system may be between 1 m and 2 m.

The gradiometer system 100 may comprise a single vacuum chamber, enclosing the components illustrated in FIG. 1. Alternatively, each MOT 101, 102 may be enclosed by respective vacuum chambers.

In gradiometer system 100, the first MOT 101 and second MOT 102, and correspondingly the optical axes of the laser beams 105, 106, are axially aligned. Such systems may determine a gravity gradient along one direction. In alternative embodiments, the first MOT 101 and second MOT 102 may be laterally separated, allowing multiple components of the gravity gradient tensor to be determined.

Figure 2:
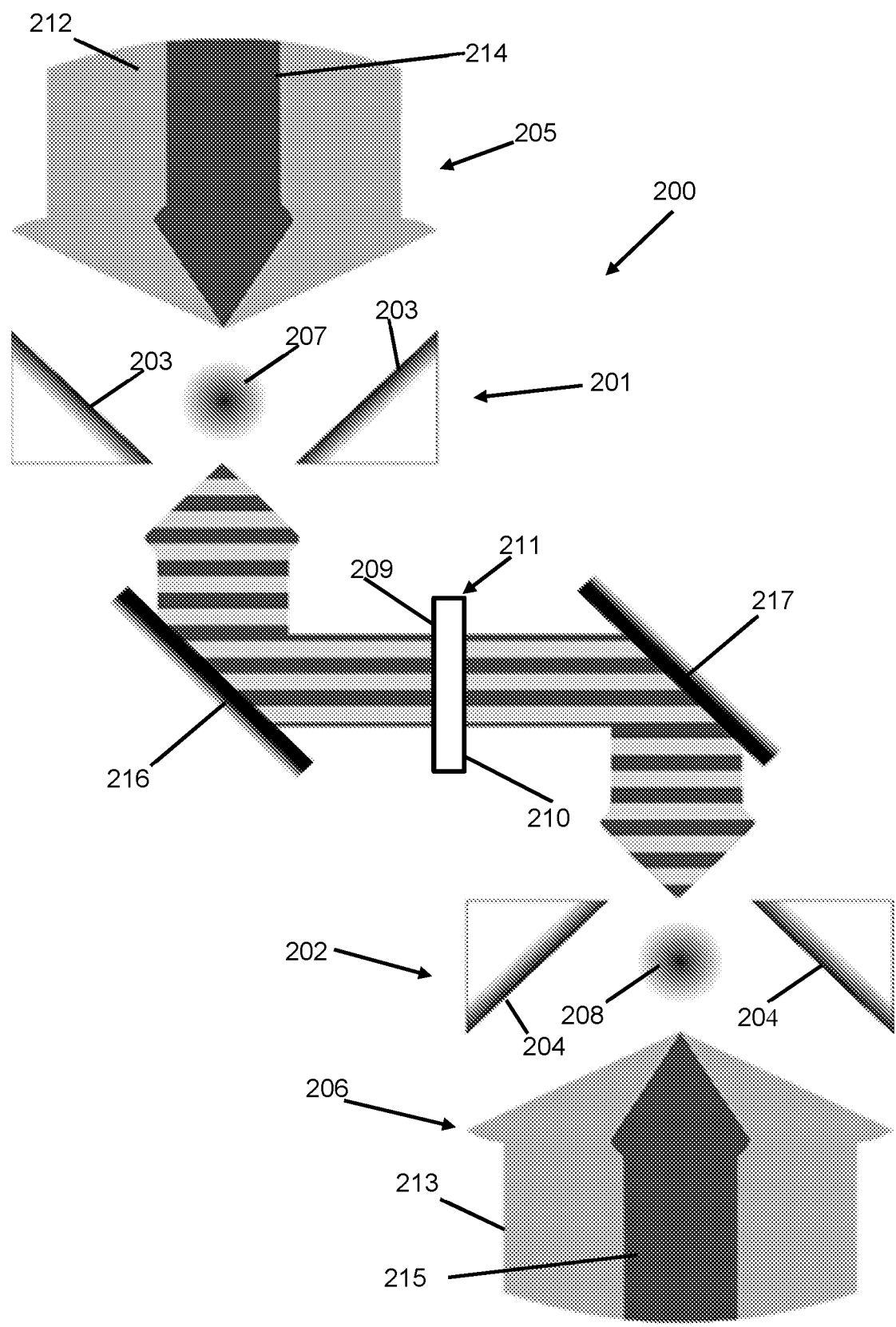
FIG. 2 shows a schematic representation of an alternative embodiment of a gradiometer system.

FIG. 2 shows one such embodiment of a 'kinked' gradiometer system 200. The components of gradiometer system 200 are similar to those of gradiometer system 100. Features in FIG. 2 which correspond to similar features in FIG. 1 have been labelled with corresponding reference labels.

In this case, the first MOT 201 and incident laser beam 205 lie on a different, laterally separated, longitudinal axis to the second MOT 202 and incident laser beam 206. First and second deflection surfaces 216, 217 (e.g. mirrors) deflect the laser beams 205, 206 from their respective longitudinal axes onto a lateral axis (i.e. an axis substantially orthogonal to the longitudinal axes of the incident laser beams 205, 206). An intermediate reflector 211, comprising first and second intermediate reflection surfaces 209, 210 is positioned on the lateral axis. The first intermediate reflection surface 209 reflects laser beam 205 back to first deflection surface 216, which in turn deflects the laser beam 206 back towards the first MOT 201, along its original longitudinal axis. Second reflecting surface 210 similarly reflects laser beam 206 back towards the second MOT 202. This arrangement allows multiple components of the gravity gradiometer tensor to be determined, as described in more detail below.

Figure 3:
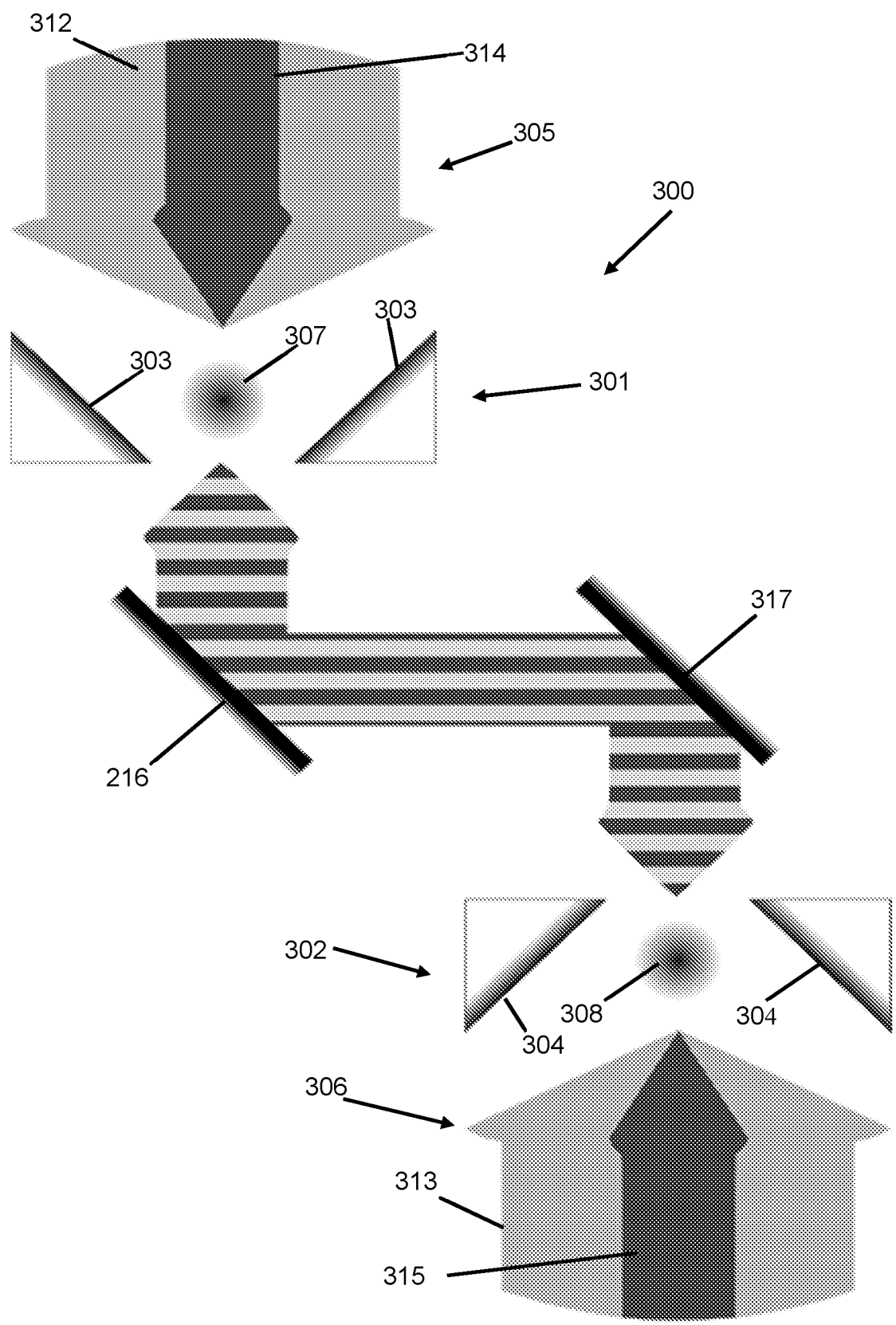
FIG. 3 shows a schematic representation of a further alternative embodiment of a gradiometer system.

FIG. 3 shows an alternative 'kinked' gradiometer system 300. Gradiometer system 300 is similar to gradiometer system 200, except that it does not comprise first and second intermediate reflection surfaces. Laser beam 305, after passing through the first MOT 301, is deflected by deflection surface 316 onto the lateral axis, and then deflected by deflection surface 317 towards the second MOT 302, along the longitudinal axis of the second incident laser beam 206. Similarly, the second laser beam 306, after passing through the second MOT 302, is deflected onto the lateral axis and then towards the first MOT 301 along the longitudinal axis of the first incident laser beam 305. In this case, as both laser beams 305, 306 pass through both MOTs 301, 302, the laser beams 305, 306 may be different to each other. In particular, the Raman beams 314, 315 of laser beams 305, 306 may each include only a single wavelength of Raman light. The wavelength of the Raman beam 314 may be different to that of the Raman beam 315. Thus each of the two Raman wavelengths needed for a gravity gradient measurement may be provided by a different Raman beam 314, 315.

Compared to the intermediate reflector arrangement of gradiometer system 200, gradiometer system 300 may provide lower alignment complexity, a slight reduction in system height (for the same baseline), and less unknown risk. On the other hand, compared to gradiometer system 300, gradiometer system 200 may provide enhanced modularity, reduced shadowing effects, potentially no off-axis ports, fewer optical axes, less stringent optical requirements, a reduced beam path, and may be manufactured with no vacuum link between the first and second MOTs 201, 202 (i.e. separate vacuum compartments, as discussed above in relation to gradiometer system 100).

Determining the Full Tensor of Gravity Gradient Components

Figure 4A:
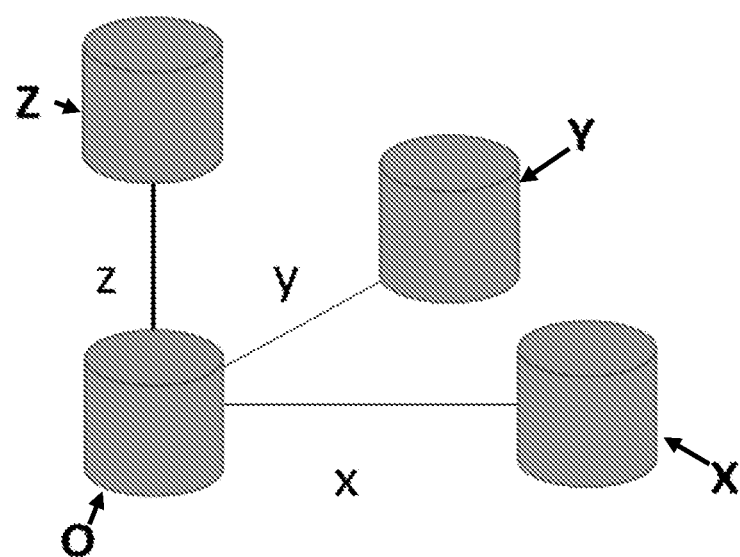
FIGS. 4a-4c illustrate determination of the gravity gradient tensor with four gravimeters.
Figure 4B:
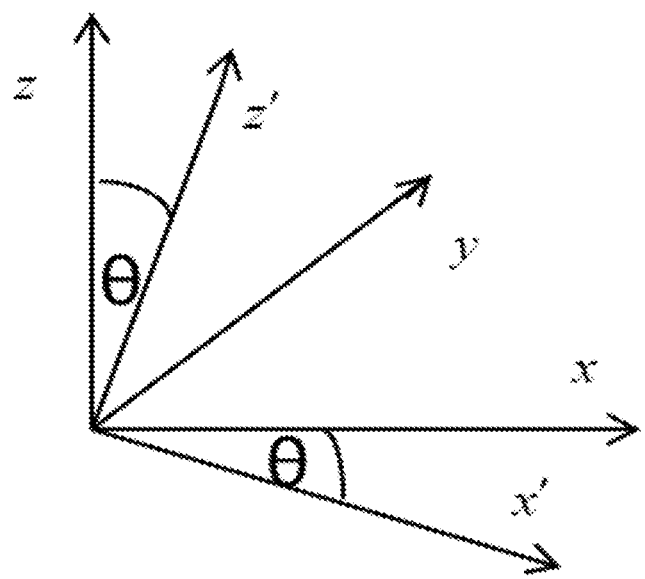

To demonstrate how gradiometer systems 200, 300 may be used to determine multiple components of a gravity gradient, we first consider the case of a four-gravimeter configuration (i.e. four separate MOTs and corresponding optical systems), as shown in FIG. 4a.

Four-Gravimeter Configuration

We first show how a configuration of four cold-atom gravimeters may be used to measure the gradient tensor. The approach relies on the fact that a single cold-atom gravimeter measures precisely the component of gravity along the Raman laser beam. All four gravimeters have vertical Raman beams along which the cold-atom clouds are dropped.

We assume a distance between the point at which the cold-atom cloud is dropped, and the point at which interrogation via fluorescence is carried out, of 15 cm. We assume that the lines of constant phase in the Raman-beam standing wave are stable and perpendicular to the direction of the beam and that the beam has a width of 2 cm. Let us assume that the Raman beam is precisely aligned to the local gravity vector. Viewed classically, an atom which starts its descent in the centre of the Raman beam will then end up still in the centre of the beam (provided its initial horizontal velocity is zero).

Suppose now that we tilt the gravimeter so that an atom starting on the Raman-beam axis ends up at the very edge of the beam. This will give a tilt angle of $\sin^{-1}(1/15)=3.8°$. This is the maximum tilt angle we will allow the four gravimeters to be subjected to.

We position the gravimeters on four vertices of a cube, one vertex corresponding to the origin of a local Euclidean coordinate system with the others at equal distances along the x, y and z axes, as shown in FIG. 4a. Let us suppose that we choose the z-axis to lie roughly in the direction of the local gravity vector, so that when the gravimeters are tilted a reasonable number of atoms end up, after their descent, still within the Raman beams. The upward vertical direction corresponds to positive z.

From this layout we can immediately get approximations to the gradient tensor components $g_{zz}$, $g_{zx}$ and $g_{zy}$, where the first subscript indicates the component of the gravity vector being operated on and the second gives the direction of the partial derivative. These approximations are just obtained by subtracting the output of gravimeter O from the outputs of gravimeters X, Y or Z and dividing by the distances between the relevant gravimeters. In what follows we will treat these distances as unity so that the differences in the outputs of the gravimeters give approximations to the appropriate gradients.

Let us now rotate the whole device rigidly around the y axis through angle of $\theta=3.8°$ in a clockwise sense, as shown in FIG. 2. A generic gravimeter will pick up a signal of $g_z'=g_z \cos\theta + g_x \sin\theta$ in the z' direction. Since we know $\theta$ and (in principle) $g_z$ we can, in principle, estimate $g_x$. We use the words "in principle" since measuring $g_z$ and then estimating $g_x$ is a bad idea, due to the presence of the Earth's background field. A better idea is to subtract the outputs from two neighbouring gravimeters leading to background rejection. As a consequence let us subtract $g_z'(0)$ from $g_z'(Y)$. From the case where all the gravimeters are vertical we already know the quantity $g_z(Y)-g_z(0)$. From our knowledge of $\theta$ we can then form an estimate of $g_x(Y)-g_x(0)$, i.e. we have an estimate of $g_{xy}$.

A similar rotation through 3.8° in a clockwise sense around the x axis will yield an estimate of $g_{yx}$, though strictly speaking this is unnecessary, since the gradient tensor is symmetric.

Figure 4C:
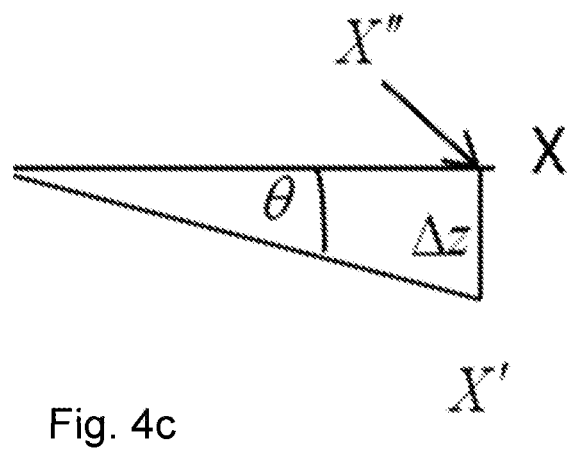

The remaining components of the gradient tensor, $g_{xx}$ and $g_{yy}$, are slightly trickier to obtain. Once we have one, however, we can get the other using $g_{xx}+g_{yy}=-g_{zz}$. Let us concentrate on $g_{xx}$. We use the same rotation about the y axis as before, i.e. we keep the structure in its rotated position. However, the difference now is that the gravimeter at X has been both rotated and translated. We denote its new position by X'. Draw a line from X' to intersect the x axis at right angles. Denote the point of intersection by X" and the length of this line by $\Delta z$, as in FIG. 4c.

Taking the difference between the gravimeter outputs at 0 and X' gives $$(g_z(X')-g_z(0))\cos\theta+(g_x(X')-g_x(0))\sin\theta \quad (1)$$

From this we wish to find $(g_x(X'')-g_x(0))$ and hence an estimate of $g_{xy}$. As a first step we need to estimate the first term in (1). To do this we make a Taylor-series expansion of $g_z(X')$ around $g_z(X)$. Retaining only first-order terms we have $g_z(X') \approx g_z(X)-g_{zx}(X)\Delta x-g_{zz}(X)\Delta z$, where $\Delta x=X-X''$. We approximate the tensor components in this by their values at the origin, estimates of which we have already found. We then have an estimate of the first term in (1). Subtracting this from (1) gives us an estimate of the second term.

From this estimate we then carry out a Taylor series expansion of our estimate of $g_x(X')$ around the desired quantity $g_x(X'')$. The second term in (1) can then be written, approximately, as $$(g_x(X'')-g_{xz}(X'')\Delta z-g_x(0))\sin\theta. \quad (2)$$

Once again we approximate the tensor component by its value at the origin. Adding $g_{xz}\Delta z \sin\omega$ to (2) gives us the quantity $(g_x(X'')-g_x(0))\sin\theta$. Using this and dividing by $\sin\theta$ we may then form an estimate of the tensor component $g_{xx}$ via $$g_{xx} \approx \frac{g_x(X'') - g_x(0)}{X''}$$

where, by an abuse of notation, we denote the distance along the x axis between the origin and the point X" by X".

The same exercise may be gone through, if one so desires, by rotating around the x axis, to obtain $g_{yy}$, but, as pointed out previously, this is not necessary, due to the linear relationship between the diagonal components of the gradient tensor. Note that since $\sin\theta$ is small we need the variations of the x and y components of the gravity vector with x and y to be of the order of tens of Eo for the approach to be meaningful, assuming a final accuracy of 1 Eo. Note further that in order to get equal signal-to-noise ratios in all the components of the gradient tensor, one could envisage deliberately degrading the signal-to-noise ratio of each gradiometer, when vertical, by shortening the drop distance. This would then mean that the signal-to-noise in various other components could be increased, since $\sin\theta$ could be increased accordingly.

Three-Gravimeter Configuration

Based on the above we will see that if one is prepared to do three rotations then one can use just three gravimeters. Again we assume one Raman beam per gravimeter.

Figure 5:
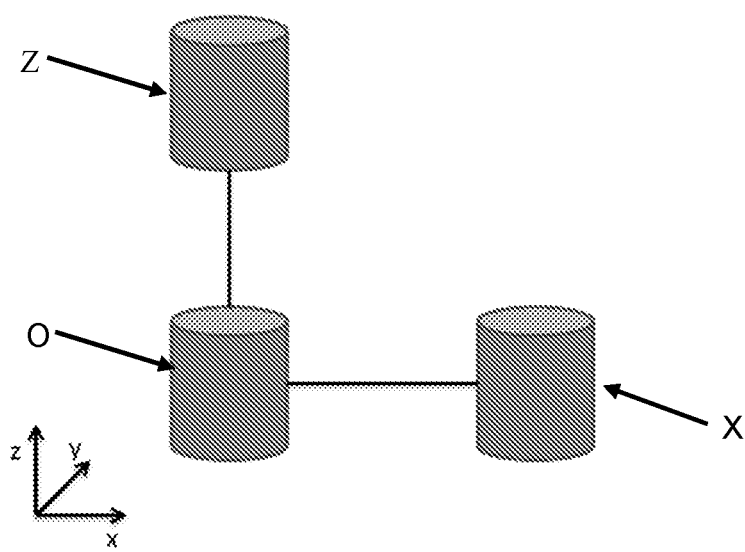
FIG. 5 illustrates determination of the gravity gradient tensor with three gravimeters.

We assume that the three gradiometers lie in the x-z plane, as in FIG. 5. Referring back to the coordinate system for the 4-gravimeter configuration, one of the gravimeters in the new configuration lies at the origin O and the other two lie at X and Z. Again we take the distances between O and X, and O and Z, to be unity.

With all the gravimeters vertical we can immediately get estimates of $g_{zz}$ and $g_{zx}$, as for the four-gravimeter case. Now rotate around the z axis by 90° in an anticlockwise direction so that the device lies in the y-z plane, with all the gravimeters vertical. This gives us an estimate of $g_{zy}$, arrived at in the same way as for the four-gravimeter case. With the device lying in the y-z plane if we rotate around the y axis in the same way as for the four-gravimeter case we can get the component $g_{xy}$.

Now rotate the device back to the x-z plane and rotate again around the y-axis in the same way as for the four-gravimeter case. We then get the component $g_{xx}$, in exactly the same way as for the four-gravimeter case. The remaining components are trivially obtained using the symmetries of the gradient tensor.

Two-Gravimeter Configuration

The number of gravimeters can be reduced further to two, as in the present invention, at the expense of additional rotations.

Figure 6:
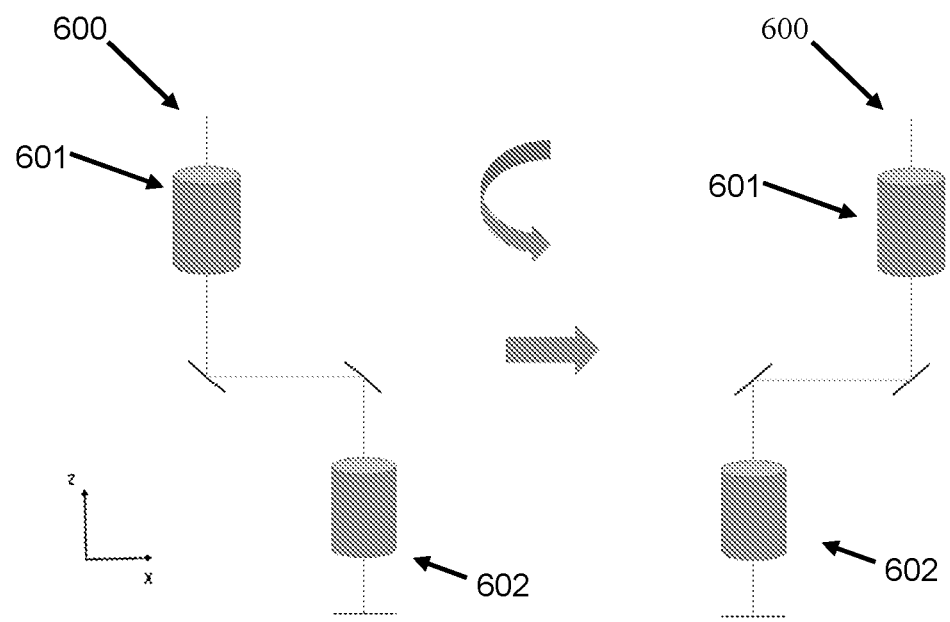
FIG. 6 illustrates determination of the gravity gradient tensor with two gravimeters.

With these two gravimeters we can also use a single Raman beam, as is the case for gradiometer system 300. An alternative representation of such a system 600 is shown in FIG. 6. System 600 comprises a first gravimeter 600 (comprising a first MOT and suitable optical components to direct and incident laser beam onto the first MOT) and a second gravimeter 602 (comprising a second MOT and suitable optical components to direct and incident laser beam onto the second MOT). We assume that the Raman beam is linearly polarised and the direction of polarisation is either in the incidence plane at the first mirror or is normal to this plane. The polarisation is then preserved by the reflection. The same is true of the remaining mirrors.

Due to the single Raman beam we have better rejection of vibration. Furthermore we can use the ellipse-fitting method to arrive the value of the difference between the outputs of the two gravimeters.

A difference with this configuration is that the difference between the outputs of the two gravimeters does not correspond to a single component of the gradient tensor. It does, however, correspond to a simple linear combination of components.

Let us assume that the two gravimeters are positioned as in the diagram on the left in FIG. 6. This corresponds to the starting configuration of the three-gravimeter configuration, except that the gravimeter at the origin is missing, and we now have a single Raman beam.

We can get the components $g_{zz}$ and $g_{zx}$ as follows. The gravimeter at Z records $g_z(Z)$. That at X records $g_z(X)$. The difference of these two gravimeter outputs is $g_z(Z)-g_z(X)$. We can rewrite this as $g_z(Z)-g_z(O)+g_z(O)-g_z(X) \approx g_{zz}-g_{zx}$. Now rotate the device through 180° around the z-axis, as shown in FIG. 6. The difference of the two gravimeter outputs is now $g_z(Z)-g_z(-X)$. We can rewrite this as $g_z(Z)-g_z(O)+g_z(O)-g_z(-X) \approx g_{zz}+g_{zx}$. We thus see that if we take the sum of the output of the device on the left in FIG. 6 and the output of its rotated version on the right in FIG. 6 we arrive at $2g_{zz}$. Similarly the difference of the two outputs (each output itself being a difference) gives $-2g_{zx}$.

To summarise, then, we can replace the initial three-gravimeter configuration with the two-gravimeter one, provided we carry out the additional rotation around the z-axis. The analysis then proceeds as for the three-gravimeter configuration; with each rotated version of the three-gravimeter device we can get the same information with the two-gravimeter device by carrying out the additional 180° rotation around the (rotated) z-axis. At no point in this sequence is any gravimeter tilted by more than the maximum allowed tilt.

The above method may be used to determine the full tensor gravity gradient. For some applications, only a subset of the tensor components may need to be determined.

Figure 7:
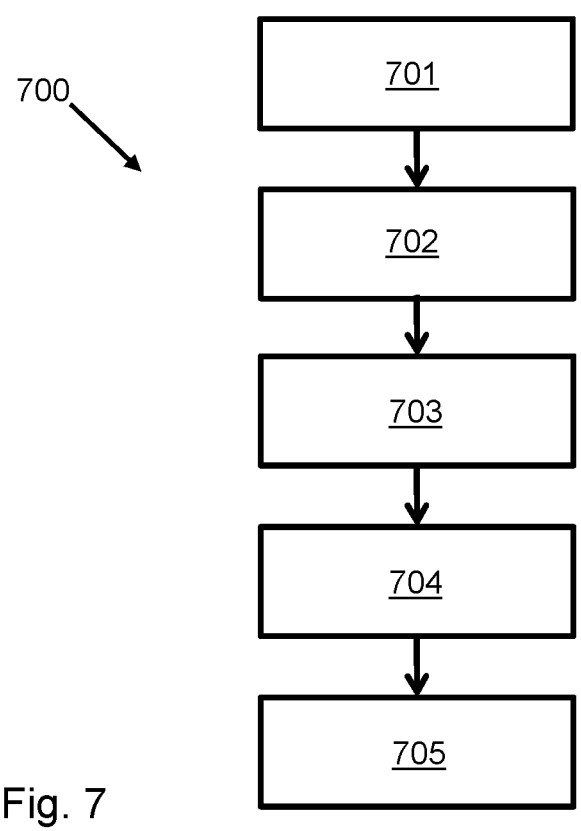
FIG. 7 illustrates a method of determining multiple components of the gravity gradient tensor.

FIG. 7 illustrates a method 700 that may be used with gradiometer systems of the present invention, particularly systems 200 and 300, to determine at least two components of the gravity tensor.

At step 701, a first gravity difference is measured between the first magneto-optical trap and second magneto-optical trap of the gradiometer system with the gradiometer system in a first position (i.e. the gravity difference between the respective fluorescence detection regions of the first and second gravimeters is measured).

At step 702, the gradiometer system is rotated by substantially 180° about a rotation axis from the first position to a second position, the rotation axis being parallel to both the first longitudinal axis and second longitudinal axis of the gradiometer system.

At step 703, a second gravity difference is measured between the first magneto-optical trap and second magneto-optical trap of the gradiometer system with the gradiometer system in the second position.

At step 704, a first component of the gravity gradient is determined from the sum of the first gravity difference and the second gravity difference.

At step 705, a second component of the gravity gradient is determined from the difference between the first gravity difference and the second gravity difference.

To determine any additional tensor components, the system may be rotated or tilted as described above to yield the desired component.

By using such methods, multiple, or even all components of the gravity gradient may be determined using a system comprising just two gravimeters, a much simpler and more compact arrangement than in conventional systems for determining gravity gradient components.

Figure 8:
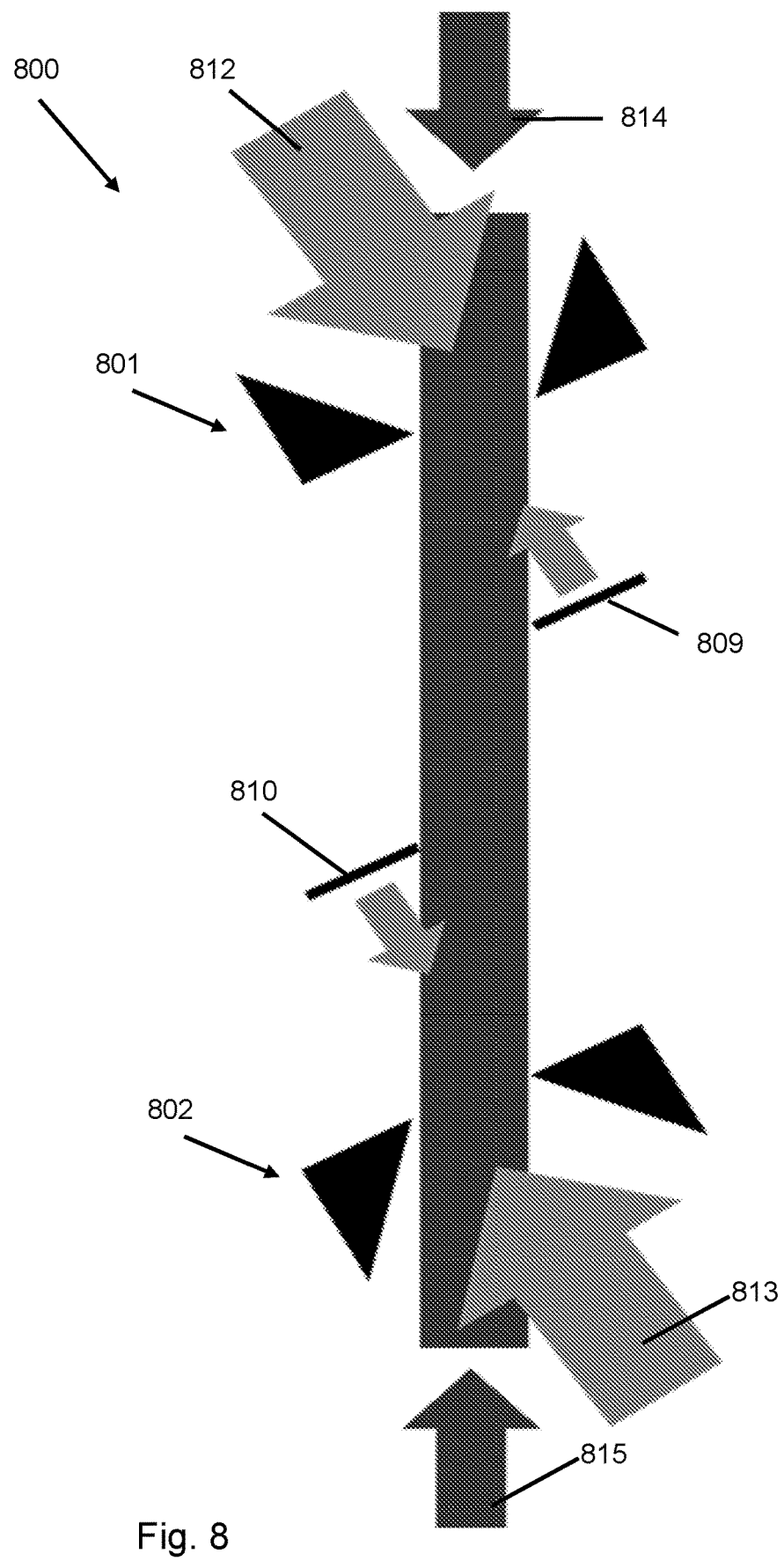
FIG. 8 is an alternative example of a gravity gradiometer system.

FIG. 8 shows an alternative example of a gravity gradiometer system 800. The system 800 comprises first and second magneto-optical traps 801, 802, which are similar to first and second MOTs 101, 102. In contrast to system 100, in which the Raman beams are directed coaxially to the cooling beams, system 800 does not comprise a common laser beam path such as laser beam 105. Instead, the cooling beams and Raman beams travel along non-parallel axes. In particular, a first cooling beam 812 is directed towards the first MOT 801 along a first longitudinal axis, and is reflected back into first MOT 801 by a first intermediate reflection surface 809. A second cooling beam 813 is directed towards the second MOT 802 along a second longitudinal axis, and is reflected back into second MOT 802 by a second intermediate reflection surface 810. A first Raman beam 814 is directed towards the first MOT 801 along a first atom interferometry axis. The first atom interferometry axis lies at a non-zero angle to the first longitudinal axis—in effect the first MOT 801 and associated cooling beam 812 are tilted with respect to the atom interferometry axis. Similarly, a second Raman beam 815 is directed towards the second MOT 802 along a second atom interferometry axis, and is reflected back along that axis by intermediate reflection surface 810. The second interferometry axis lies at a non-zero angle to the second longitudinal axis. The angles between the Raman beams and the first and second longitudinal axis may be similar or different, and may for example be between 10 and 30 degrees.

In the illustrated embodiment, the first and second atom interferometry axes are co-incident. In alternative embodiments, the first and second atom interferometry axes may be parallel but laterally separated. In use, the system 800 may be arranged such that the first and second atom interferometry axes are substantially aligned with the local gravity vector. The arrangement of system 800 has the advantage of allowing alternative implementations of the optical-subsystem in which the Raman beams can interact with both atom clouds while still using the reflective surfaces 809, 810 for the cooling beams.

Figure 9:
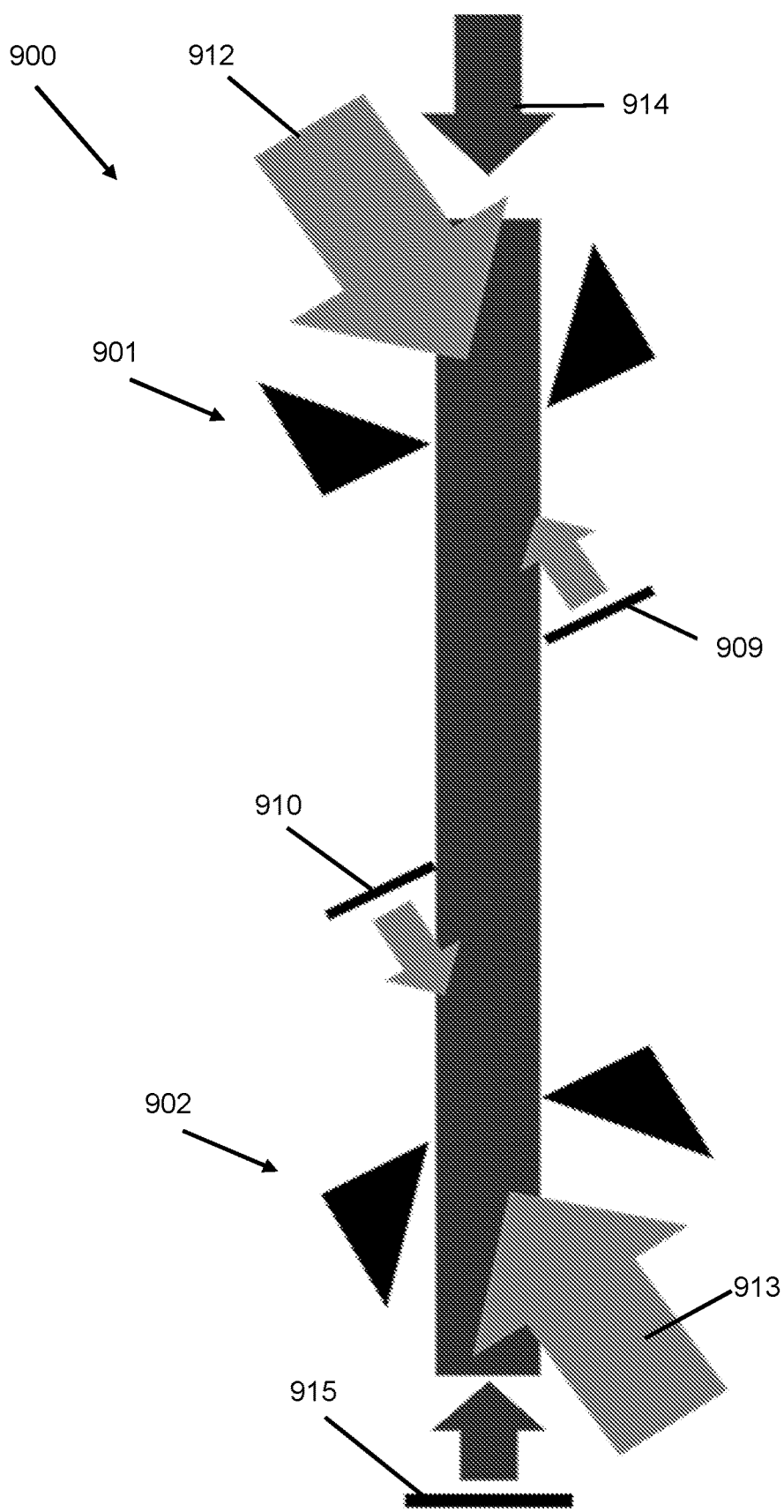
FIG. 9 is a further example of a gravity gradiometer system.

FIG. 9 shows a further example of a gravity gradiometer system 900, which is similar to system 800. In particular, system 900 comprises a first MOT 901, a second MOT 902, first intermediate reflection surface 909, second intermediate reflection surface 910, first cooling beam 912 and second cooling beam 913, similarly to the corresponding features of system 800. In this system 900, however, a single Raman beam 914 is used, and is directed along the atom interferometry axis towards the first MOT 901 and subsequently to the second MOT 902. After passing through the second MOT 902, the Raman beam 914 is reflected back along the atom interferometry axis by Raman mirror 915, such that the Raman beam 914 again passes through the second MOT 902 and then first MOT 901. Using a single Raman beam 914 in this way may reduce the complexity of the optical subsystem.

FIG. 10 illustrates an alternative example of a gravity gradiometer system 1000 similar to that of FIG. 1, with the exception that the intermediate reflection surfaces are not present. Instead, the atom interferometry beams 1014, 1015 and a portion of the cooling beams 1012, 1013 pass through to the other MOT 1001, 1002. The system 1000 otherwise works in the same way as for the example shown in FIG. 1, with the laser beams 1005, 1006 being directed towards corresponding MOTs 1001, 1002, each of which comprise a plurality of mirrored surfaces 1003, 1004 arranged to reflect a respective incident laser beam 1012, 1013 to trap a respective cold cloud of atoms 1007, 1008.

Other embodiments are intentionally within the scope of the invention as defined by the appended claims.

The invention claimed is:

1. A cold atom gravity gradiometer system comprising:
    first and second magneto-optical traps, each having a plurality of mirrored surfaces arranged to reflect respective first and second incident laser beams to trap respective first and second cold atom clouds separated from each other by a separation distance; and
    an optical subsystem arranged to provide the first and second incident laser beams separately for the respective first and second magneto-optical traps and to transmit the first incident laser beam in a first direction along a first longitudinal axis towards the first magneto-optical trap and the second incident laser beam in an opposite second direction along a second longitudinal axis towards the second magneto-optical trap, the second longitudinal axis being parallel to the first longitudinal axis.

2. The cold atom gravity gradiometer system of claim 1, wherein the first laser beam comprises a first cooling laser beam and a first atom interferometry beam, and the second laser beam comprises a second cooling laser beam and a second atom interferometry beam.

3. The cold atom gravity gradiometer system of claim 2, wherein the first and second atom interferometry beams are substantially coaxial with the respective first and second cooling laser beams.

4. The cold atom gravity gradiometer system of claim 1, comprising first and second intermediate reflection surfaces arranged to reflect the respective first and second laser beams back towards the respective first and second cold atom clouds.

5. The cold atom gravity gradiometer system of claim 1, wherein each of the first and second magneto-optical traps comprise four mirrored surfaces angled with respect to the respective first and second intermediate reflection surfaces and arranged around the respective first and second longitudinal axes to reflect the respective first and second incident laser beams towards the respective first and second cold atom clouds.

6. The cold atom gravity gradiometer system of claim 1, wherein the first longitudinal axis is substantially coincident with the second longitudinal axis.

7. The cold atom gravity gradiometer system of claim 4, wherein the first and second intermediate reflection surfaces are arranged on the respective first and second longitudinal axes.

8. The cold atom gravity gradiometer system of claim 1, wherein the second longitudinal axis is laterally offset from the first longitudinal axis.

9. The cold atom gravity gradiometer system of claim 4, wherein the first and second intermediate reflection surfaces are arranged on a lateral axis between the first longitudinal axis and the second longitudinal axis, and wherein the system further comprises first and second deflection surfaces to deflect the laser beam onto the lateral axis from the first longitudinal axis and second longitudinal axis respectively.

10. The cold atom gravity gradiometer system of claim 9, wherein the optical subsystem is further arranged to transmit a Raman beam along an atom interferometry axis towards the first and second magneto-optical traps, and wherein the angle between the atom interferometry axis and the first longitudinal axis is greater than 0°.

11. The cold atom gravity gradiometer system of claim 10, wherein the optical subsystem is arranged to direct a first Raman beam towards the first magneto-optical trap in a first direction along the atom interferometry axis, and to direct a second Raman beam towards the second magneto-optical trap in an opposite, second direction along the atom interferometry axis.

12. The cold atom gravity gradiometer system of claim 10, further comprising a Raman mirror positioned along the atom interferometry axis after the first and second magneto-optical traps, and arranged to reflect the Raman beam back along with atom interferometry axis towards the second and first magneto-optical traps.

13. The cold atom gravity gradiometer system of claim 4 wherein the first and second intermediate reflection surfaces are arranged to reflect the respective first and second incoming laser beams away from a central region between the first and second magneto-optical traps.

14. The cold atom gravity gradiometer system of claim 4, wherein the first and second intermediate reflection surfaces form opposing first and second surfaces of an intermediate reflector.

15. A cold atom gravity gradiometer system comprising:
    first and second magneto-optical traps, each having a plurality of mirrored surfaces arranged to reflect an incident laser beam to trap respective first and second cold atom clouds separated from each other by a separation distance; and
    an optical subsystem arranged to transmit a first laser beam in a first direction along a first longitudinal axis towards the first and second magneto-optical traps and a second laser beam in an opposite second direction along a second longitudinal axis towards the second and first magneto-optical traps,
    wherein the first magneto-optical trap is arranged on the first longitudinal axis and the second magneto-optical trap is arranged on the second longitudinal axis, and wherein the second longitudinal axis is parallel to and laterally offset from the first longitudinal axis.

16. The cold atom gravity gradiometer system of claim 15, wherein the system comprises:
    a first deflection surface arranged to deflect the first laser beam from the first longitudinal axis onto a lateral axis between the first and second longitudinal axes, and to deflect the second laser beam from the lateral axis onto the first longitudinal axis; and
    a second deflection surface arranged to deflect the second laser beam from the second longitudinal axis onto the lateral axis, and to deflect the first laser beam from the lateral axis onto the second longitudinal axis.

17. The cold atom gravity gradiometer system of claim 1, wherein the system is rotatable around at least one rotation axis.

18. The cold atom gravity gradiometer system of claim 1 wherein the first and second magneto-optical traps are disposed within respective first and second vacuum chambers.

19. The cold atom gravity gradiometer system of claim 18 wherein the first and second vacuum chambers are connected to a vacuum system disposed at least partially between the first and second vacuum chambers.

20. The cold atom gravity gradiometer system of claim 1 wherein the separation distance is adjustable.

21. A method comprising:
  determining a gravity gradient using a gravity gradiometer system comprising:
    first and second magneto-optical traps, each having a plurality of mirrored surfaces arranged to reflect respective first and second incident laser beams to trap respective first and second cold atom clouds separated from each other by a separation distance; and
    an optical subsystem arranged to provide the first and second incident laser beams separately for the respective first and second magneto-optical traps and to transmit the first incident laser beam in a first direction along a first longitudinal axis towards the first magneto-optical trap and the second incident laser beam in an opposite second direction along a second longitudinal axis towards the second magneto-optical trap, the second longitudinal axis being parallel to the first longitudinal axis, wherein the first longitudinal axis is offset from the second longitudinal axis,
  wherein the determining a gravity gradient comprises:
    measuring a first gravity difference between the first magneto-optical trap and second magneto-optical trap of the gradiometer system with the gravity gradiometer system in a first position;
    rotating the gravity gradiometer system by substantially 180° about a rotation axis from the first position to a second position, the rotation axis parallel to the first longitudinal axis and second longitudinal axis;
    measuring a second gravity difference between the first magneto-optical trap and second magneto-optical trap of the gradiometer system with the gravity gradiometer system in the second position;
    determining a first component of the gravity gradient from the sum of the first gravity difference and the second gravity difference; and
    determining a second component of the gravity gradient from the difference between the first gravity difference and the second gravity difference.

22. The method of claim 21, further comprising:
  rotating the gravity gradiometer system about an additional rotation axis to a third position, the additional rotation axis orthogonal to the first longitudinal axis and second longitudinal axis; and
  measuring an additional gravity difference between the first magneto-optical trap and second magneto-optical trap of the gradiometer system with the gravity gradiometer system in the third position.

23. The cold atom gravity gradiometer system of claim 1, wherein the first and second incident laser beams are provided from respective first and second opposing ends of the cold atom gravity gradiometer system.

24. The cold atom gravity gradiometer system of claim 15, wherein the first and second incident laser beams are provided separately from respective first and second opposing ends of the cold atom gravity gradiometer system.

25. The method of claim 21, comprising providing the first and second incident laser beams from respective first and second opposing ends of the cold atom gravity gradiometer system.

* * * * *